No. 767,220. PATENTED AUG. 9, 1904.
C. F. GRAEBER.
RAT TRAP.
APPLICATION FILED NOV. 5, 1903.
NO MODEL.
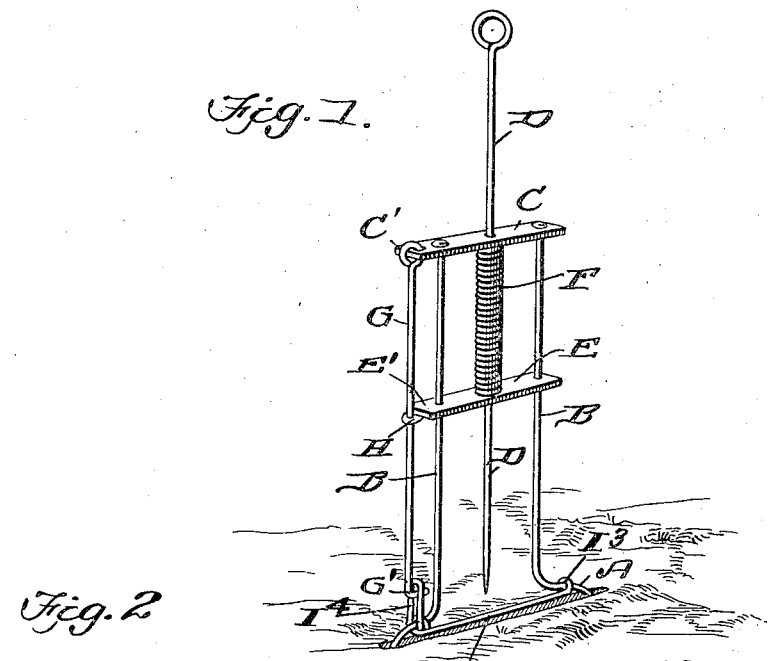
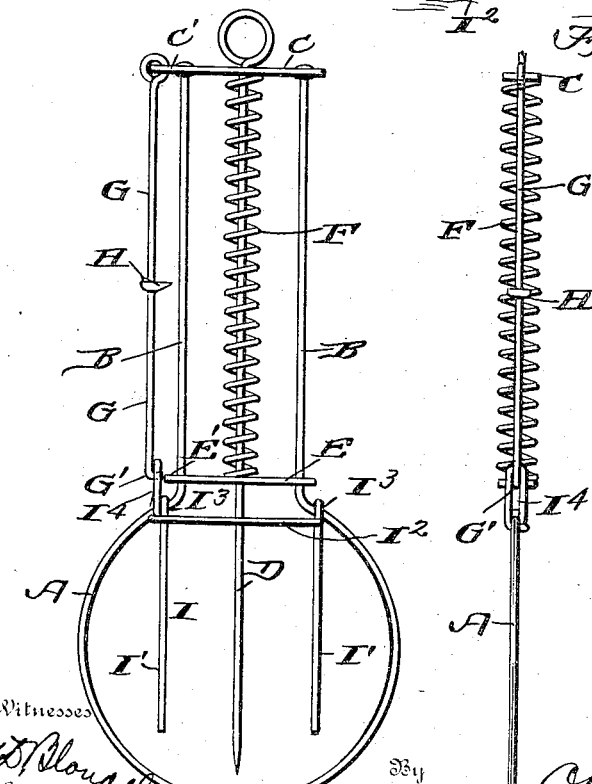
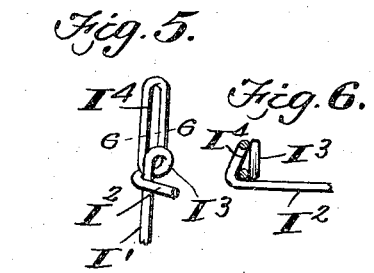
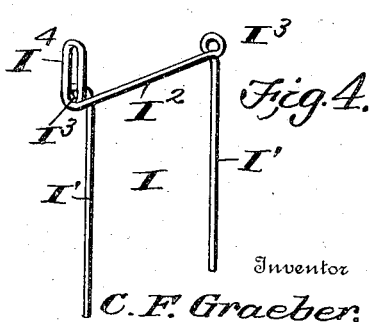
Inventor
C. F. Graeber No. 767,220. Patented August 9, 1904.

UNITED STATES PATENT OFFICE.

CHARLES F. GRAEBER, OF LYTTON, IOWA.

RAT-TRAP.

SPECIFICATION forming part of Letters Patent No. 767,220, dated August 9, 1904.

Application filed November 5, 1903. Serial No. 179,973. (No model.)

*To all whom it may concern:*

Be it known that I, CHARLES F. GRAEBER, a citizen of the United States, residing at Lytton, in the county of Sac and State of Iowa, have invented a new and useful Rat-Trap, of which the following is a specification.

This invention relates generally to rat-traps, and more particularly to that class thereof known as "impalement-traps." It will also be understood that although my invention is particularly adapted for entrapping rats it can be employed for trapping all other kinds of animals which burrow in the ground.

The object of the invention is to provide a simple and efficient device which can be set in the ground in the path of travel of the animal and which will be operated by the passage of the animal in either direction.

Another object of the invention is to provide a device which shall be exceedingly simple both in construction and operation and one sufficiently inexpensive to enable it to be used generally.

With these objects in view the invention consists in the novel features of construction hereinafter fully described, and pointed out in the claims.

In the drawings, forming part of this specification, Figure 1 is a perspective view showing the practical application of my invention, the trap being shown as set. Fig. 2 is a face view of the trap, the parts being shown in the position as sprung. Fig. 3 is an edge view of the same. Fig. 4 is a detail perspective view of the trigger. Fig. 5 is an enlarged detail of the tripping-arm. Fig. 6 is a detail section on the line 6 6 of Fig. 5.

In constructing a trap in accordance with my invention I employ a wire frame which consists of a circular lower portion A, which is adapted to be inserted in the ground on the line of passage of the animal, and the parallel upright members B, which project upwardly from the circular portion and rest above the ground, as most clearly shown in Fig. 1, said parallel members being connected at their upper end by a cross-plate C, said cross-plate having a projecting end C' for the purpose hereinafter explained. The impaling-spike D passes downwardly through an opening in the cross-plate C and also through a plate E, which slides upon the parallel uprights B through the opening in the ground into the line of passage of the animal, said spike being made fast to the plate E and is impelled downwardly by means of a coil-spring F, which surrounds the said spike between the cross-plate C and the plate E. When the trap is set, the spike is drawn upwardly and the spring F compressed. The impaling-spike is locked in this position by means of a locking-rod G, pivoted to the projecting end C' of the cross-plate C and carrying a finger H, which engages the projecting end E' of the sliding plate E, so that the impaling-spike will be held in an elevated position until the finger H is disengaged from the end E' of the plate E. This is accomplished by moving the rod G to one side or the other, and for the purpose of moving the said rod I employ a trigger I, which is preferably made from a single piece of wire and is pivotally connected to the circular portion A of the frame and rests within the same, so that the animal in passing through the passage will contact with the trigger and operate the same, so as to disengage the finger H from the plate E, and it will of course be understood that the moment the finger is disengaged the spring F will force the impaling-spike downwardly, which being pointed will pierce the animal and kill it. The trigger comprises the depending legs I' and connecting cross-pieces $I^2$, said legs being constructed with eyes $I^3$ at the juncture of the legs and cross-pieces, the wire of the circular portion of the frame passing through said eyes and supporting the trigger in its proper position within the frame. The trigger is also provided with the tripping-arm $I^4$, which is in the nature of a vertical elongated loop, the lower end of the rod G being bent, as shown at G', to fit into the said loop, as most clearly shown in Figs. 1 and 2.

Thus it will be seen that it is immaterial in which direction the animal is moving the operation of the trigger will be exactly the same, as the swinging movement in either direction will cause the tripping-arm to swing, carrying with it the lower arm of the rod G, which will disengage the finger H, thereby releasing the plate E.

The trap is quickly and easily set, as it is only necessary to pull upwardly on the impaling-spike and the other portions of the trap will automatically adjust themselves, or, in other words, the rod G will swing to a perpendicular position and the plate E can be brought into engagement with the finger H. For the purpose of setting up the trap it is only necessary to cut a narrow hole in the ground, as most clearly shown in Fig. 1.

Having thus fully described my invention, what I claim as new, and desire to secure by Letters Patent, is—

1. A trap comprising a frame, a spring-actuated impaling-spike movable in the said frame, a plate connected to said spike, a locking-rod pivotally connected to the frame, a finger carried by said rod and adapted to engage the plate carried by the spike and a trigger pivotally arranged in the lower part of the frame and pivotally connected with the locking-rod, as set forth.

2. A trap comprising a frame consisting of a circular lower portion and the parallel upright members and a plate at the upper ends of the said members, an impaling-spike passing through the said plate, a plate carried by the impaling-spike, a spring surrounding the spike between the two plates, a rod pivotally connected to the plate of the frame and carrying a finger adapted to engage the plate carried by the impaling-spike, and a trigger pivotally connected to the circular portion of the frame and having an upwardly-extending tripping-arm pivotally connected to the lower end of the locking-rod, as set forth.

3. A trap comprising a frame consisting of a circular lower portion, parallel upright members and a top connecting the top plate, an impaling-spike and sliding plate, a depending locking-rod having a finger, and a trigger pivotally connected to the circular portion of the frame, said trigger being constructed of a single piece of wire and consisting of the depending legs, the connecting member, pivot-eyes, and the upwardly-extending tripping-arm adapted to engage the lower end of the locking-rod, all arranged and adapted to operate substantially as described.

4. A trap comprising a frame having the upper ends connected by a plate, an impaling-spike passing through said plate, a second plate carried by the spike and sliding upon the frame, a coil-spring arranged between the plates, a locking-rod pivotally connected to the plate of the frame, said rod provided with a finger adapted to engage the plate carried by the spike, and a trigger pivotally connected to the frame having an upwardly-extending slotted tripping-arm with which the lower end of the locking-rod loosely engages, as set forth.

CHARLES F. GRAEBER.

Witnesses:
C. F. BROBEIL,
J. W. MARMET.